United States Patent [19]
Lunt et al.

[11] Patent Number: 5,613,348
[45] Date of Patent: Mar. 25, 1997

[54] METHOD AND APPARATUS FOR PACKING AN INFLATABLE AIR BAG IN A HOUSING OF AN AIR BAG MODULE ASSEMBLY

[75] Inventors: Larry F. Lunt; Michael J. Daines, both of Brigham, Utah

[73] Assignee: Morton International, Inc., Chicago, Ill.

[21] Appl. No.: 412,348

[22] Filed: Mar. 31, 1995

[51] Int. Cl.⁶ .................................................. B65B 63/04
[52] U.S. Cl. .......................... 53/429; 53/430; 280/728.1; 493/458
[58] Field of Search .............................. 53/116, 117, 118, 53/119, 120, 429, 430; 280/728.1, 728.2, 730.1, 731, 732, 743.1; 493/243, 244, 405, 409, 451, 457, 456, 458, 940

[56] References Cited

U.S. PATENT DOCUMENTS

| | | |
|---|---|---|
| 3,748,477 | 7/1973 | Wulbrecht . |
| 3,839,947 | 10/1974 | Kornas et al. |
| 3,839,948 | 10/1974 | Putti et al. . |
| 4,286,954 | 9/1981 | McArthur et al. . |
| 4,529,396 | 7/1985 | Bell . |
| 5,022,675 | 6/1991 | Zelenak, Jr. et al. . |
| 5,162,035 | 11/1992 | Baker . |
| 5,178,407 | 1/1993 | Kelley . |
| 5,240,282 | 8/1993 | Wehner et al. . |
| 5,275,435 | 1/1994 | Fischer . |
| 5,290,061 | 3/1994 | Bollaert . |
| 5,324,070 | 6/1994 | Kitagawa et al. . |
| 5,348,341 | 9/1994 | Webber . |
| 5,364,126 | 11/1994 | Kuretake et al. . |
| 5,471,817 | 12/1995 | Baker et al. ............................... 53/429 |
| 5,492,367 | 2/1996 | Albright et al. .................. 280/728.1 X |
| 5,493,846 | 2/1996 | Baker et al. ............................... 53/429 |

Primary Examiner—Daniel Moon
Attorney, Agent, or Firm—Philip C. Peterson; Steven C. Benjamin; Gerald K. White

[57] ABSTRACT

The present invention comprises a new and improved method and apparatus for packing an inflatable air bag cushion into a housing of an air bag module assembly of an occupant restraint system for a motor vehicle. After securing an inlet chute of the air bag cushion in the open end of the housing and placing the air bag on a flat support with a larger portion of the back wall thereof overlaying a small portion of the back wall with the front wall in between in a folded condition, a central portion of the air bag is clamped by a large blade and subsequently a first edge portion is folded over the central portion and a second opposite edge portion is folded over the first edge portion so that opposite edge fold lines extend outwardly just inside opposite ends of the housing. A rolling clamp is attached transversely across the folded air bag and the air bag is rolled-up on an axis moved toward the housing. An inverted channel element is placed over the rolled-up air bag from above and moves the air bag to a position at the open end of the housing. An outer wall of the channel element which in any upwardly retracted position causes the rolled-up bag to be inserted into the housing and a trailing end portion of the air bag is tucked into place in the housing with a tuck blade after the outer wall of the channel element is withdrawn upwardly.

11 Claims, 8 Drawing Sheets

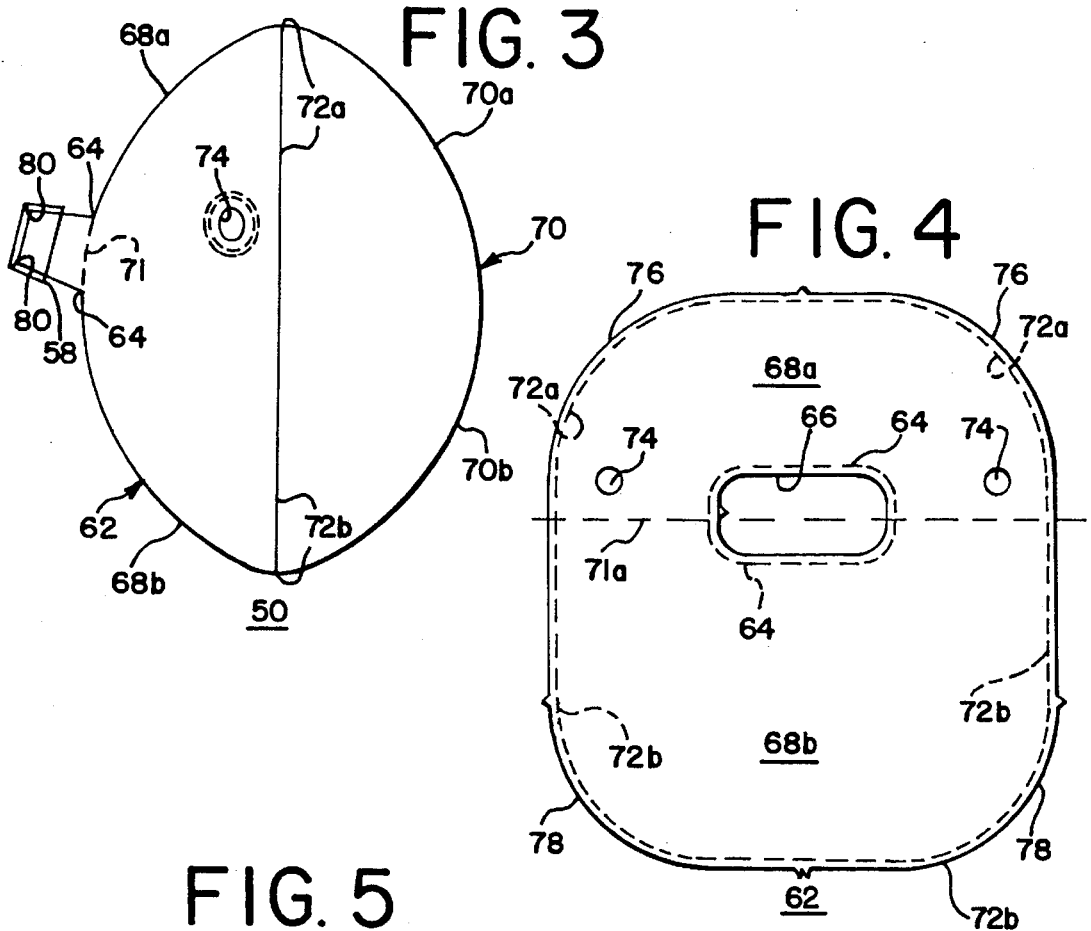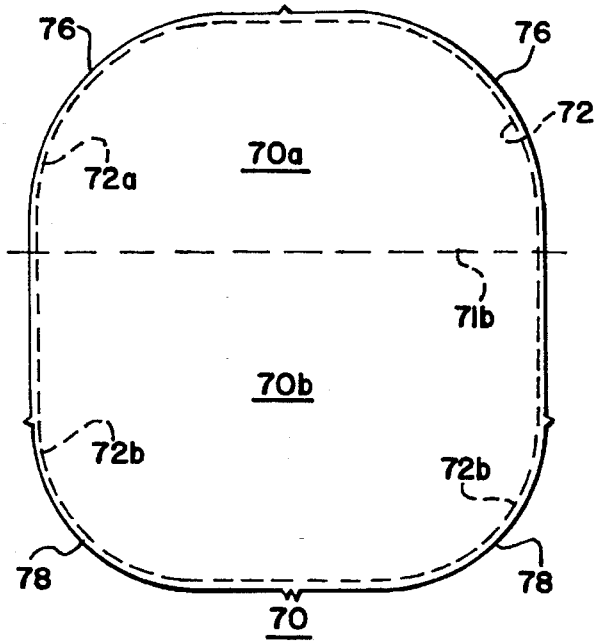

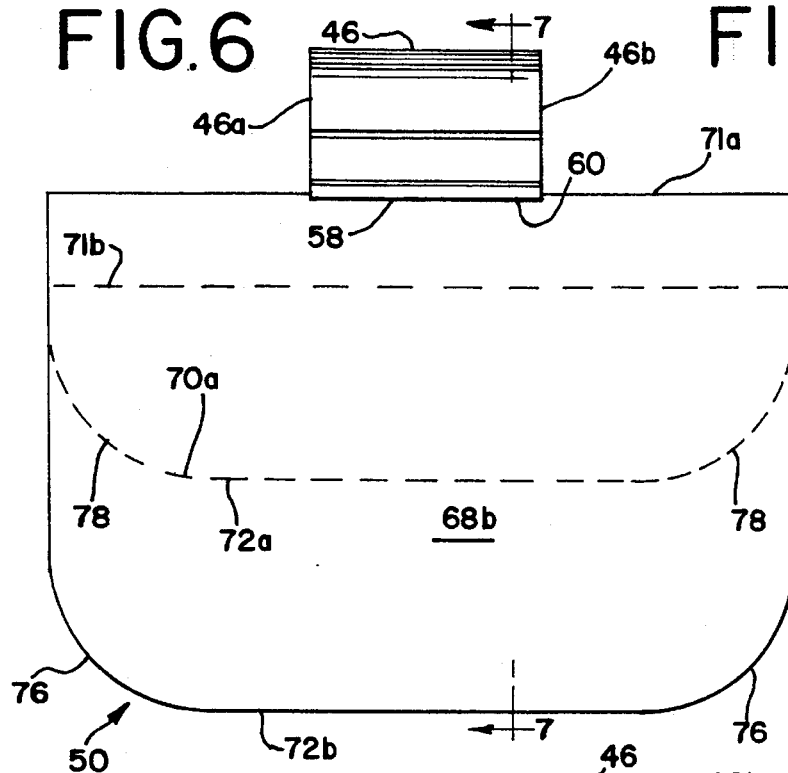
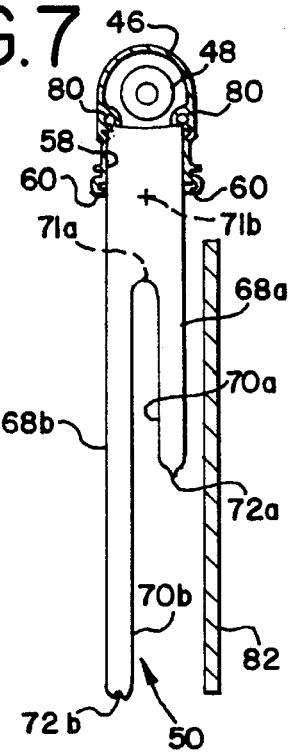
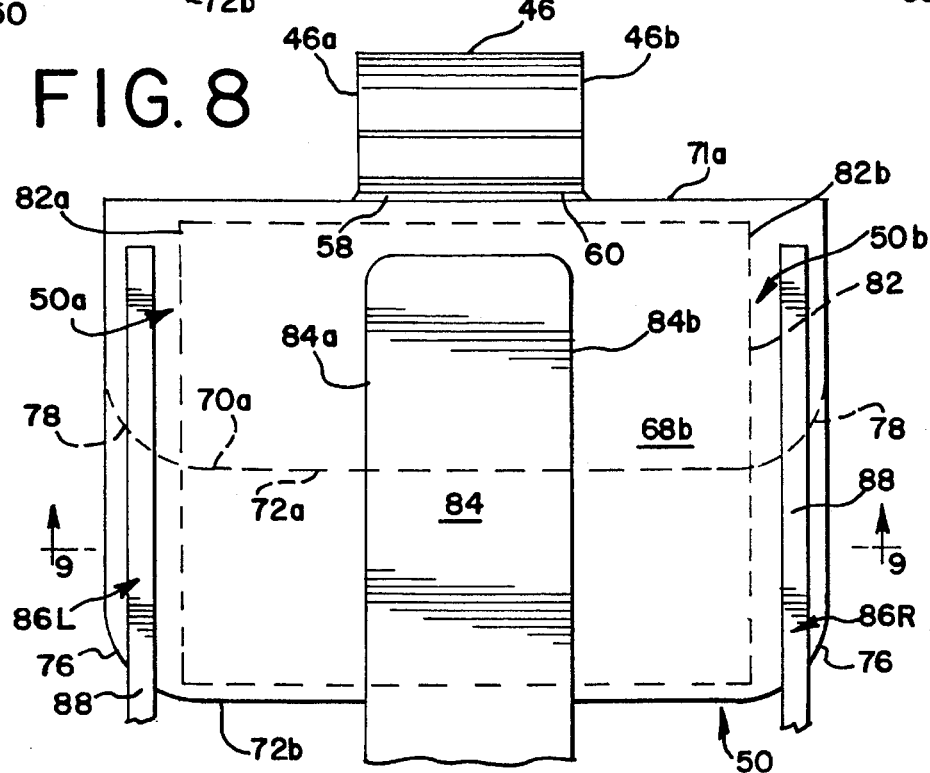
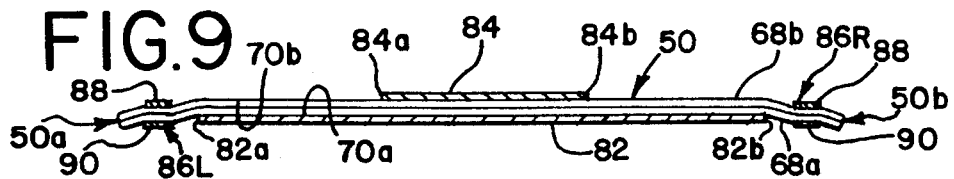

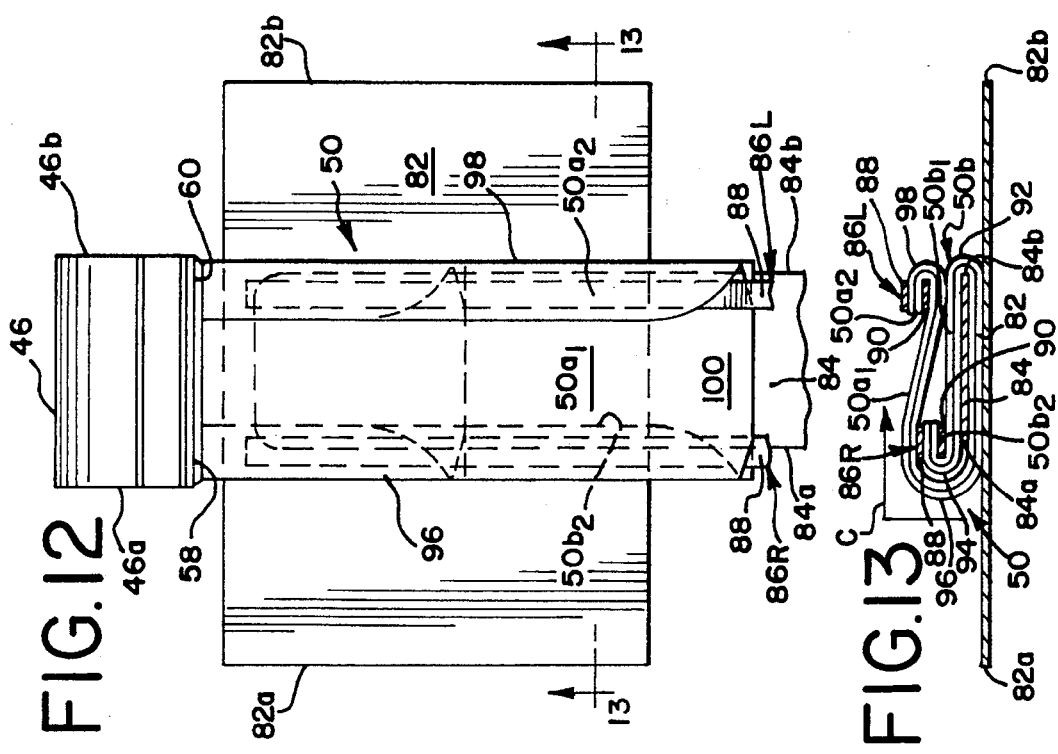
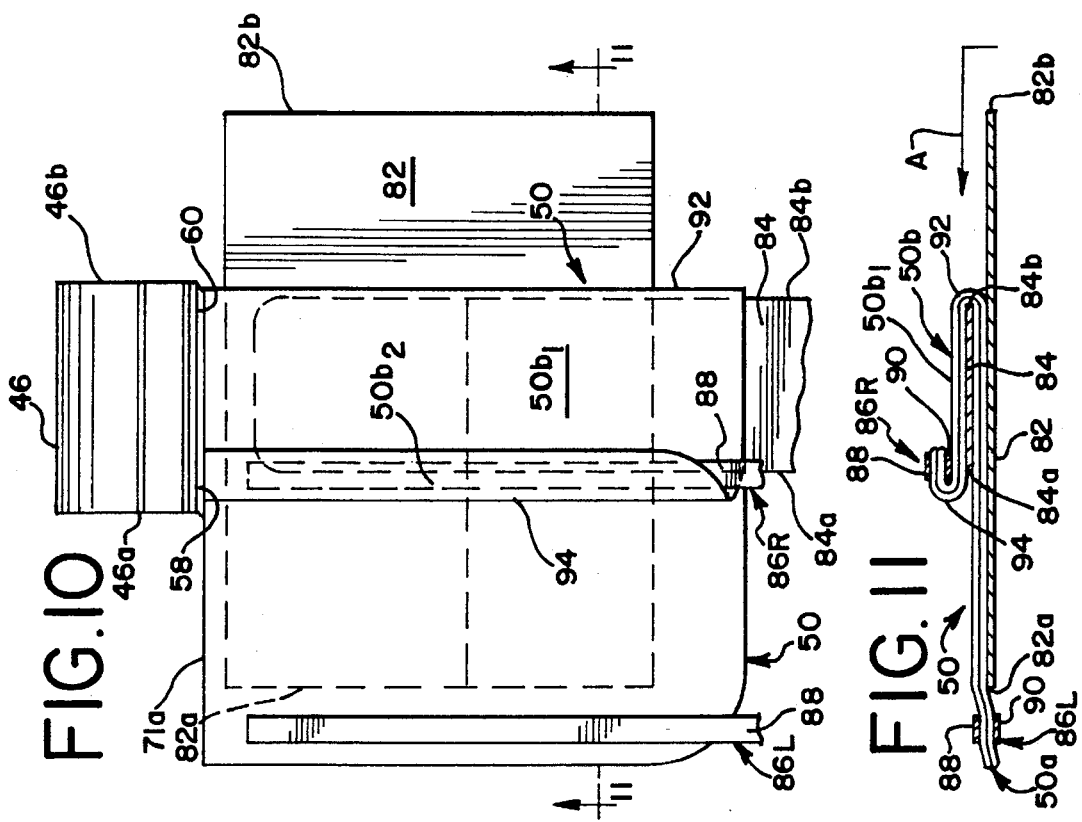

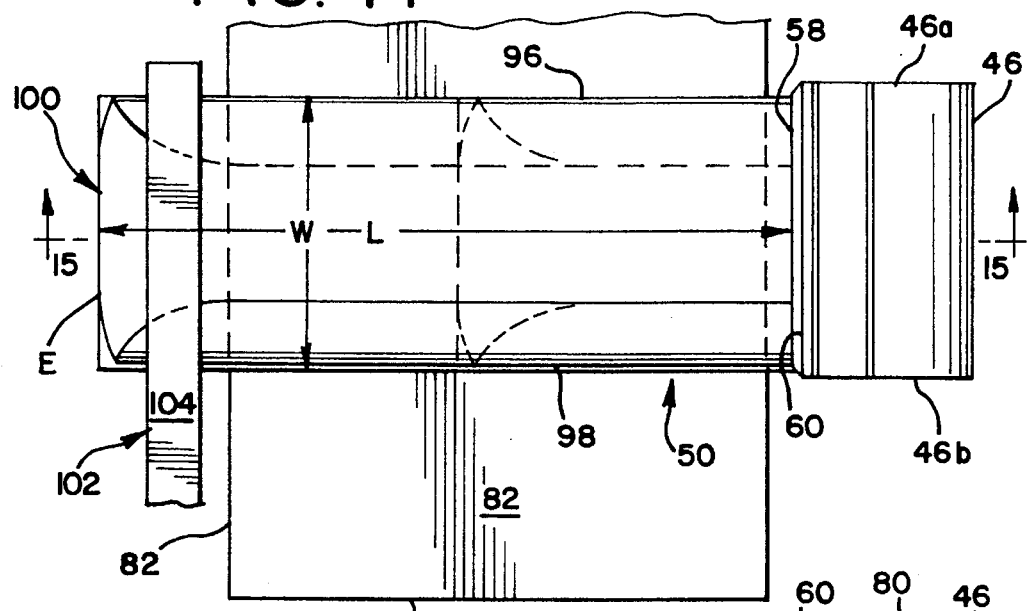
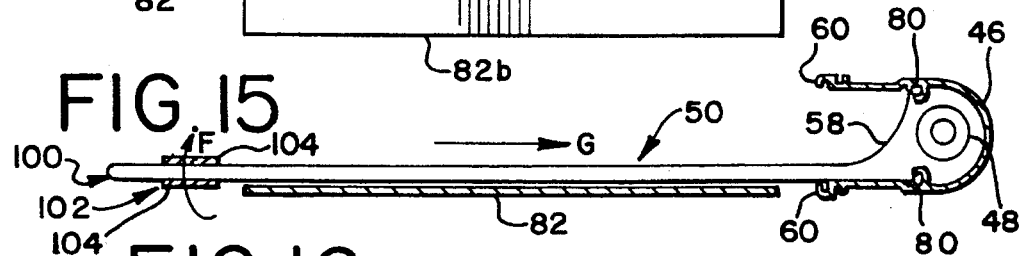
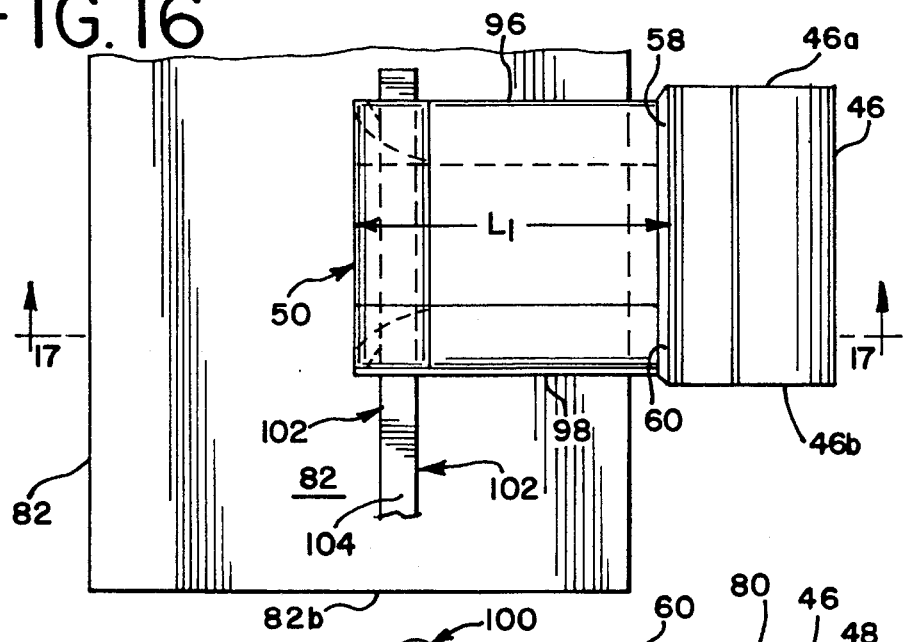
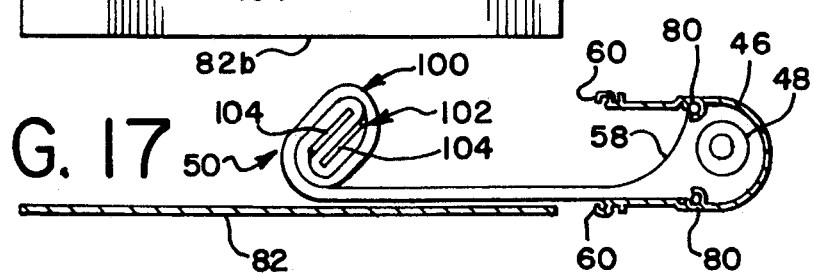

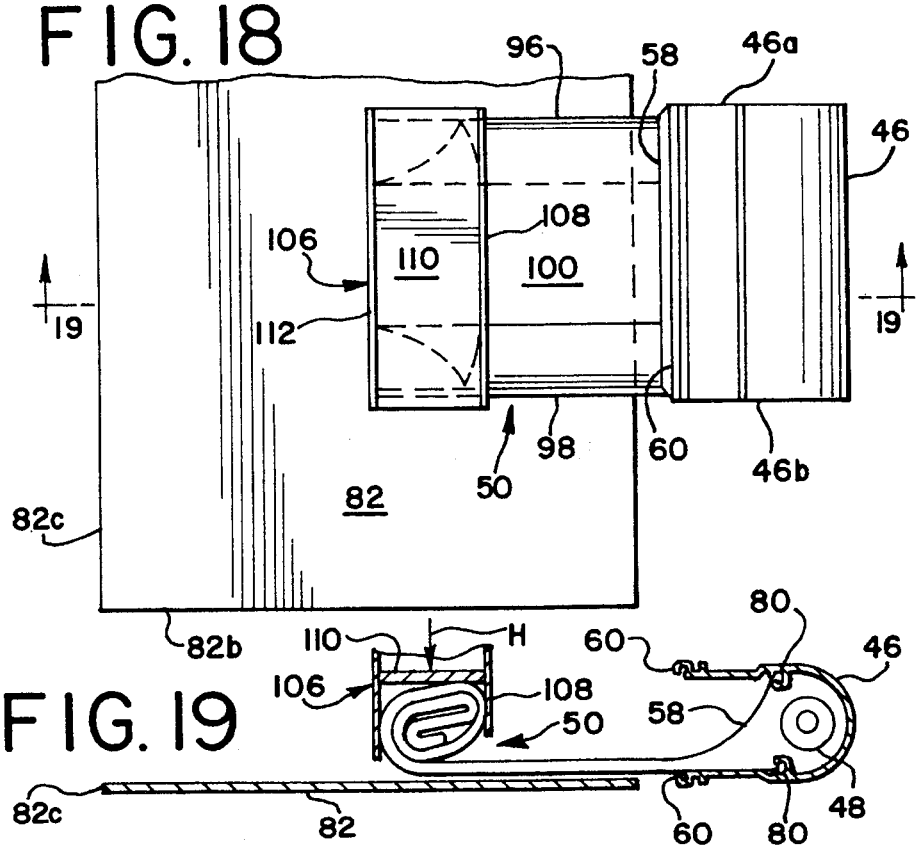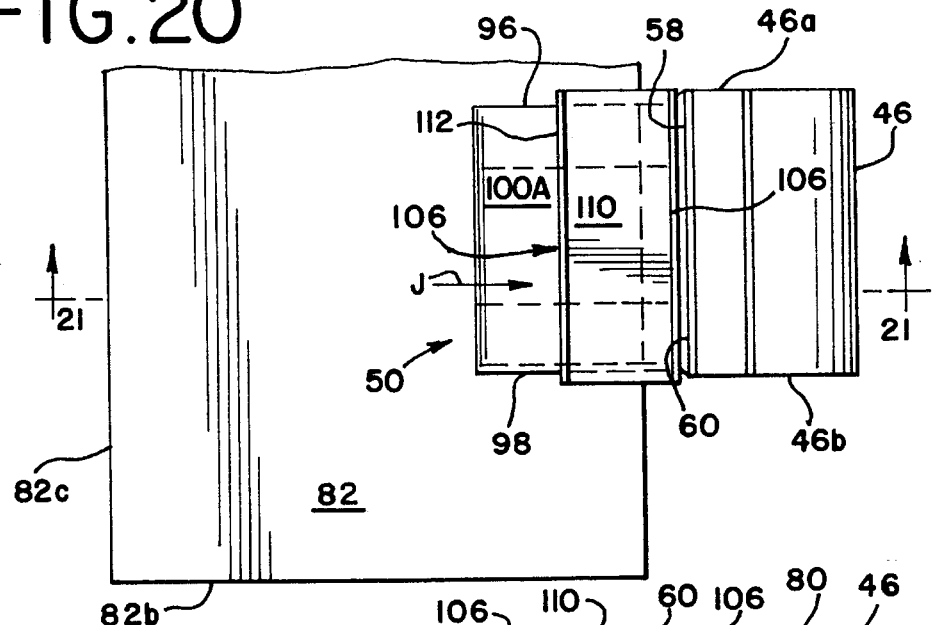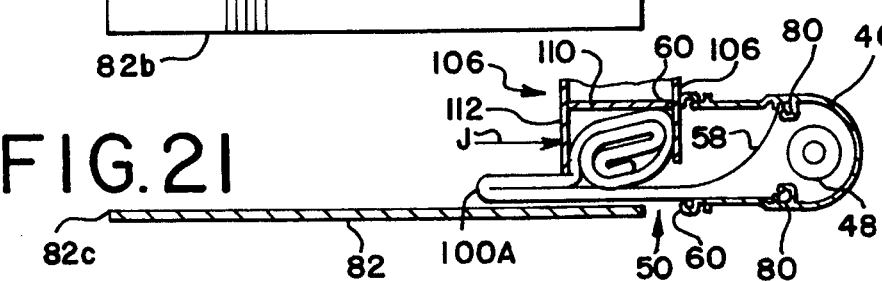

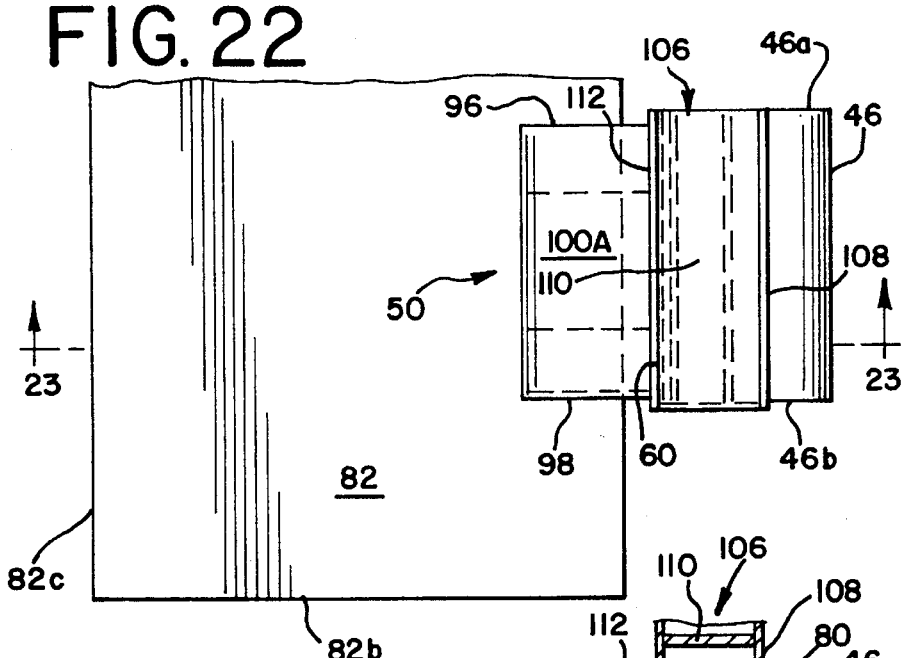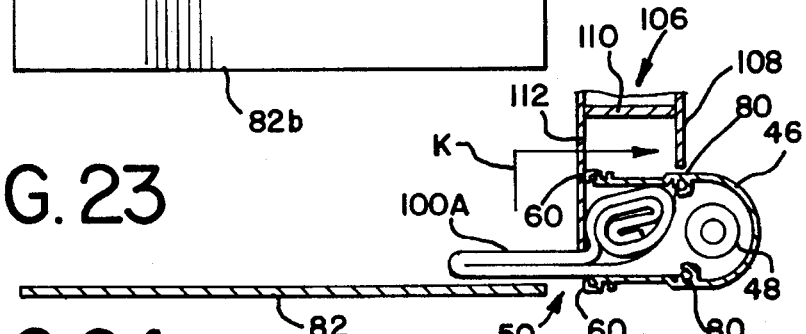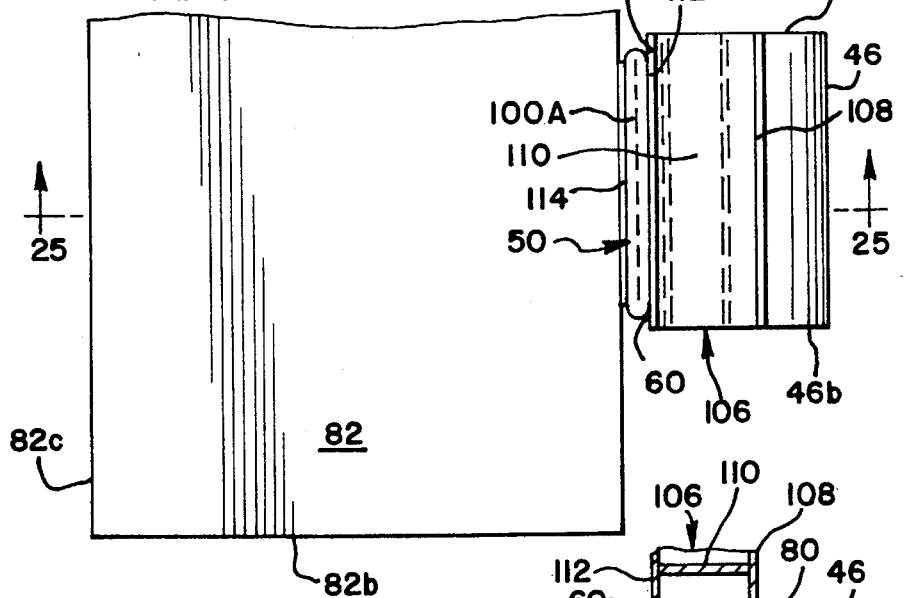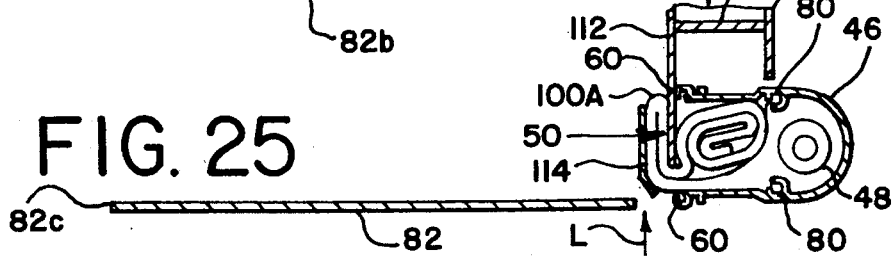

METHOD AND APPARATUS FOR PACKING AN INFLATABLE AIR BAG IN A HOUSING OF AN AIR BAG MODULE ASSEMBLY

BACKGROUND OF THE INVENTION

1. Field of the Invention

The present invention relates to a new and improved method and apparatus for packing an inflatable air cushion in a housing of an air bag module assembly of a motor vehicle restraint system. More particularly, the present invention relates to a new and improved method and apparatus for folding an inflatable air bag cushion and inserting the folded cushion into a housing in a quick and efficient manner so that a rapid inflation of the air bag cushion can be assured when the system is activated in the event of an emergency. The method and apparatus of the present invention is especially designed and adapted for use with "Pillow" type air bag cushions which generally resemble a pillow in construction and appearance when inflated and which are suitable for use in a passenger side air bag module assembly.

2. Background of the Prior Art

Kitagawa et al U.S. Pat. No. 5,324,070 discloses an air bag device for a knee of an occupant in a vehicle adapted to extend transversely of the vehicle when inflated in front of the occupants' legs from a location offset from the center of the occupant. Opposite longitudinal ends of the air bag cushion are first folded over onto a bag surface opposite a bag filling inlet which is located off center with respect to the ends. Longitudinally extending side portions of the air bag cushion are next folded over onto the same bag surface followed by successive folding over of both of the opposite end portions of the bag toward the filling inlet bag.

Kuretake et al U.S. Pat. No. 5,364,126 discloses a specially folded air bag cushion and inflator of circular outline having a central filling opening and a pair of eccentric vent openings on a side opposite an occupant cushioning surface. From a flat position with the cushioning surface on top, an edge portion of the bag is folded over along a line in one direction so that the vent openings face upwardly and a portion of the edge portion away from the vent openings is folded over to cover the same. Thereafter an opposite edge portion of the bag is folded over in similar fashion followed by folding over opposite portions of the bag from opposite ends along lines generally normal to the first direction so that the air bag will initially fill along the first direction and thereafter along the second direction. The air bag is finally put into a pleated condition in the housing.

Fischer U.S. Pat. No. 5,275,435 discloses an air bag cushion which is folded into a pleated condition from both top and bottom portions and has a first folded portion which pivots and moves sideways as the air bag cushion inflates to direct the vehicle occupant to one side. The air bag cushion is folded to create side pleats which are tucked to the inside of the air bag cushion which is rolled up from both ends.

Webber U.S. Pat. No. 5,348,341 discloses a method of folding an air bag cushion wherein each side is folded twice with all four folds overlapping and then is rolled for insertion into the module housing with a flap positioned over the roll.

Bollaert U.S. Pat. No. 5,290,061 discloses a folded air bag cushion that is tucked up from the bottom inside the air bag cushion and then pleated, rolled, or a combination of pleating and rolling action is used to bring in the sides.

Wehner et al U.S. Pat. No. 5,240,282 discloses an air bag folding technique wherein an air bag cushion is pleated from the bottom, then folded and pleated horizontally and inserted into the housing. The pleats along vertical lines do not overlap from opposite sides but meet adjacent the center.

Zelanak, Jr. et al U.S. Pat. No. 5,022,675 discloses an air bag folding technique wherein the sides are pleated inwardly and the side pleated bag is then rolled up for insertion in the module housing.

McArthur U.S. Pat. No. 4,286,954 discloses a method of folding an inflatable restraint cushion for storage in a support housing wherein an overlying top sheet and an underlying bottom sheet of the cushion are placed in a taut condition between the housing and an imaginary line parallel thereto. A portion of the top sheet is successively moved toward the housing so as to form a series of overlying pleated sections which are progressively shorter in length and eventually rotating the pleated cushion as a unit into a cavity of the housing.

Wullbrecht U.S. Pat. No. 3,738,477 discloses an air bag cushion which is rolled up to create a bubble which acts as a restraint to prevent sudden upward movement during inflation as successive rolled up layers are inflated resulting in a smaller frontal mass first moving into contact with the occupant.

Kornas et al U.S. Pat. No. 3,839,947 discloses apparatus for tucking and rolling a vehicle occupant air bag cushion which is clamped under tension while tucked from the ends and then is rolled up.

Bell U.S. Pat. No. 4,529,396 discloses apparatus for forming a rolled tubular fabric article.

Putti et al U.S. Pat. No. 3,839,948 discloses apparatus for rolling a vehicle occupant air bag into a stored condition including a pair of carriers for clamping an air bag on opposite sides of a diffuser and movable toward the diffuser to roll up opposite portions of the bag.

Kelley U.S. Pat. No. 5,178,407 discloses a folded air bag having a first portion with a plurality of folds in stacked relation providing a surface area for engaging a vehicle occupant upon air bag inflation and a second portion with a plurality of folds in stacked relation providing a surface for engaging the vehicle windshield.

Baker U.S. Pat. No. 5,162,035 discloses a bag folding system in which pleats are created on the sides of an airbag, these pleats are then tucked inside the air bag cushion, and the cushion is rolled up to create a final bag pack.

OBJECTS OF THE INVENTION

An object of the present invention is to provide a new and improved method and apparatus for packing an inflatable air bag cushion in a housing of an air bag module assembly mounted in a motor vehicle for providing a restraint system for an occupant.

Another object of the present invention is to provide a new and improved method and apparatus for folding an inflatable air bag cushion and inserting the folded cushion into a housing of an air bag module in a quick and efficient manner to insure that a proper rapid inflation of the air bag cushion will take place when an emergency occurs.

Yet another object of the present invention is to provide a new and improved method and apparatus of the character described in the foregoing objects especially designed and useful with "pillow" type air bag cushions.

It is yet another object of the present invention to provide a new and improved method of folding an inflatable air bag cushion in a manner resulting in a desirable air bag deployment pattern while the air bag is inflated upon an emergency.

Yet a further object of the present invention is to provide a new and improved method of folding an inflatable air bag cushion which reduces the number of pleats and the cushion pack volume required, and which enables automatic folding equipment to be used and begin rolling of the bag at any point along the length thereof.

A further object of the present invention is to provide a new and improved method of folding an inflatable air bag cushion which reduces the amount of automated equipment needed for the folding process.

A still further object of the present invention is to provide a new and improved method for packing a pillow type inflatable air bag cushion into a housing of an air bag module assembly of a motor vehicle passenger restraint system.

Another object of the present invention is to provide a new and improved apparatus for packing a pillow type inflatable air bag cushion into a housing of an air bag module assembly of a motor vehicle passenger restraint system.

Another object of the present invention is to provide a new and improved method and apparatus for packing a passenger side inflatable air bag cushion into a passenger side air bag module assembly for a motor vehicle restraint system.

BRIEF SUMMARY OF THE PRESENT INVENTION

The foregoing and other objects and advantages of the present invention are accomplished in a new and improved method for packing a pillow type air bag cushion into a passenger side air bag module assembly having a housing for holding an inlet chute of the air bag with front and back wall portions of the bag in a folded and rolled-up condition ready for inflation in an emergency. After insertion and securing of the inlet chute portion of the air bag cushion from an open end of the housing, the front and back walls are laid out over a relatively flat support in front of the open end of the housing. A larger lower portion of the back wall of the air bag cushion is placed in overlying relation over a smaller portion of the back wall with the front wall of the air bag in between the back walls in a folded condition central portion of the laid out air bag cushion extends outwardly in front of the housing and is clamped and held tightly against the support by a large centrally disposed holding blade. Pairs of elongated narrow clamping blades in spaced parallel relation on opposite sides of the large central holding blade are secured to and extend along opposite edge portions of the laid out air bag.

A first pair of the narrow clamping blades with an edge portion of the bag held therebetween is moved transversely inwardly toward and over the large central holding blade. This movement forms first a fold line of the air bag aligned just inside a first end wall of the housing and an opposite second fold line just inside an opposite second end wall of the housing. A second pair of the narrow clamping blades with an opposite edge portion of the bag held therebetween is moved transversely inwardly toward the large central holding blade and over the folded opposite side portion of the air bag thereby forming a fold line overlying the second fold line and aligned just inside a second end wall of the housing.

The large central holding blade and the pairs of narrow side clamping blades are all released and moved away from the folded air bag cushion, which now resembles an elongated multi-layer tongue projecting outwardly from the open end of the housing and having folded opposite side edge portions aligned just inside and projecting outwardly of opposite end walls of the housing.

A pair of narrow, clamping blades extending transversely to the tongue-like configuration of the folded air bag cushion are secured to clamp the air bag at a position along the length thereof preferably near the outer end. The transverse clamping and rolling blades are then rolled about an axis aligned therewith moving toward the open end of the housing to roll up the tongue-like configuration of the folded air bag into a roll approaching the housing. An inverted channel shaped element is moved down over the rolled-up air bag and the transverse clamping and rolling blades are then withdrawn. The channel element is then moved toward the open end of the housing until an inside wall of the element is adjacent the outer edge of its housing, leaving a trailing outer end portion of the partially rolled-up air bag cushion extending outwardly of an outer wall of the channel element. The outer wall of the channel element is maintained at this level in contact with the trailing outer end portion of the air bag as the inside wall is drawn upwardly to open up the open end of the housing. The outer wall of the channel element is then moved toward the housing to force the rolled-up air bag cushion inside. Finally, a tuck blade is moved upwardly from below to fold the trailing outer end portion of the air bag upwardly against the outer wall of the channel element, which is then withdrawn upwardly so that the tuck blade may move toward the open end of the housing to force the remaining trailing end portion of the air bag inside the housing.

BRIEF DESCRIPTION OF THE DRAWINGS

For a better understanding of the present invention, reference should be had to the following detailed description taken in conjunction with the drawings, in which:

FIG. 3 is side elevational view of a pillow type air bag cushion in an inflated condition.

FIG. 4 is a view of a pattern of a back wall of the air bag cushion of FIG. 3.

FIG. 5 is a view of a pattern of a front wall of the air bag cushion of FIG. 3.

FIG. 6 is a top plan view illustrating a housing of an air bag module assembly with a pillow type air bag cushion secured therewith and laid out in a flat support.

FIG. 7 is a cross-section view taken substantially along lines 7—7 of FIG. 6.

FIG. 8 is a top plan view similar to FIG. 6, illustrating in somewhat animated fashion, portions of folding apparatus in accordance with the present invention for clamping and folding the air bag cushion.

FIG. 9 is a transverse cross-sectional view taken substantially along lines 9—9 of FIG. 8.

FIG. 10 is a top plan view similar to FIG. 8 illustrating the air bag cushion and apparatus after folding of one edge portion of the air bag has been completed.

FIG. 11 is a transverse cross-sectional view taken substantially along lines 11—11 of FIG. 10.

FIG. 12 is a top plan view similar to FIG. 10 illustrating the air bag cushion and apparatus after folding of an opposite edge portion of the air bag has been completed.

FIG. 13 is a transverse cross-sectional view taken substantially along lines 13—13 of FIG. 12.

FIG. 14 is a top plan view illustrating the housing and air bag cushion with another portion of the apparatus for rolling-up the folded air bag cushion.

FIG. 15 is a cross-sectional view taken substantially along lines 15—15 of FIG. 14.

FIG. 16 is a top plan view similar to FIG. 14 illustrating the air bag cushion in a partially rolled-up condition.

FIG. 17 is a cross-sectional view taken substantially along lines 17—17 of FIG. 16.

FIG. 18 is a top plan view similar to FIG. 16 illustrating the air bag cushion after engagement by a channel element form above for moving of the partially rolled-up bag toward a position adjacent the open end of the housing.

FIG. 19 is a cross-sectional view taken substantially along lines 19—19 of FIG. 18.

FIG. 20 is a top plan view similar to FIG. 18 illustrating the air bag cushion and channel element in position adjacent the open end of the housing.

FIG. 21 is a cross-sectional view taken substantially along lines 21—21 of FIG. 20.

FIG. 22 is a top plan view similar to FIG. 20 illustrating the partially rolled-up air bag cushion after insertion into the open end of the housing by an outer wall of the channel element, which element is above the housing.

FIG. 23 is a cross-sectional view taken substantially along lines 23—23 of FIG. 22.

FIG. 24 is a top plan view similar to FIG. 22 illustrating the air bag cushion having a trailing end portion engaged by a tucking blade and forcing into an upright condition against the outer wall of the channel element.

FIG. 25 is a cross-sectional view taken substantially along lines 25—25 of FIG. 24.

DETAILED DESCRIPTION OF A PREFERRED EMBODIMENT OF THE INVENTION

Figure 1:
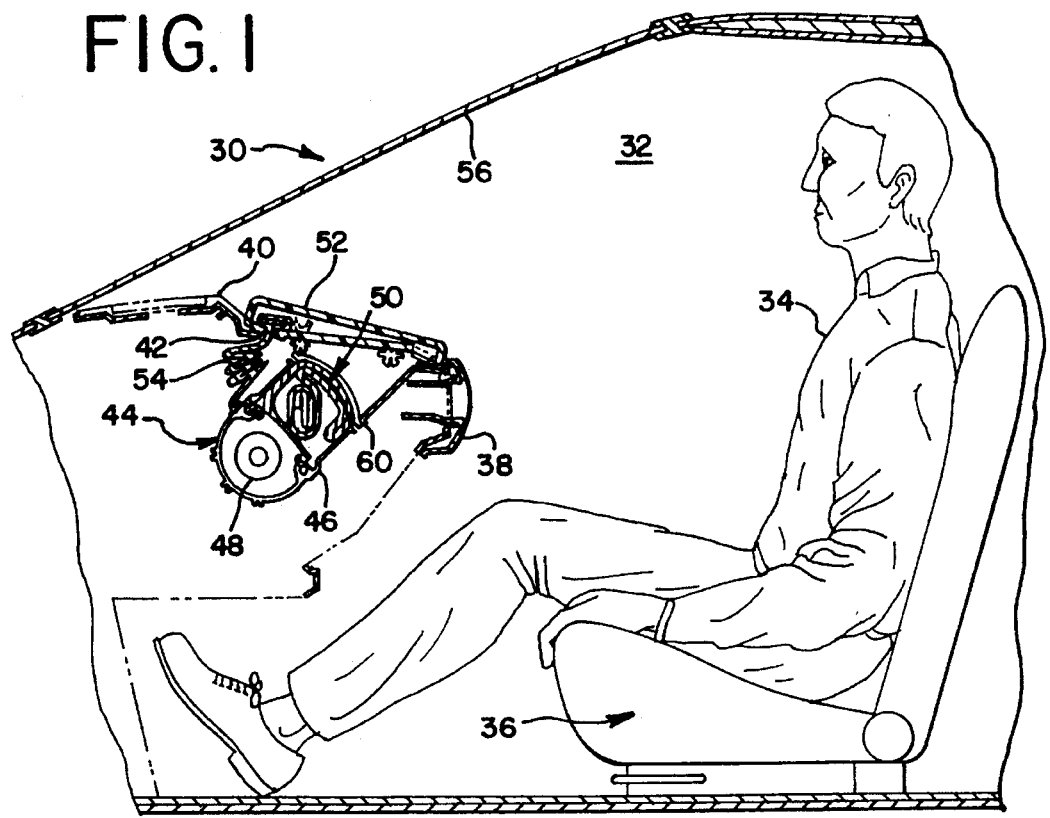
FIG. 1 is a longitudinal, vertical cross-sectional view of a passenger compartment of a motor vehicle having an inflated air bag cushion therein which has been packed into a housing of an air bag assembly module in accordance with the method of the present invention.
Figure 2:
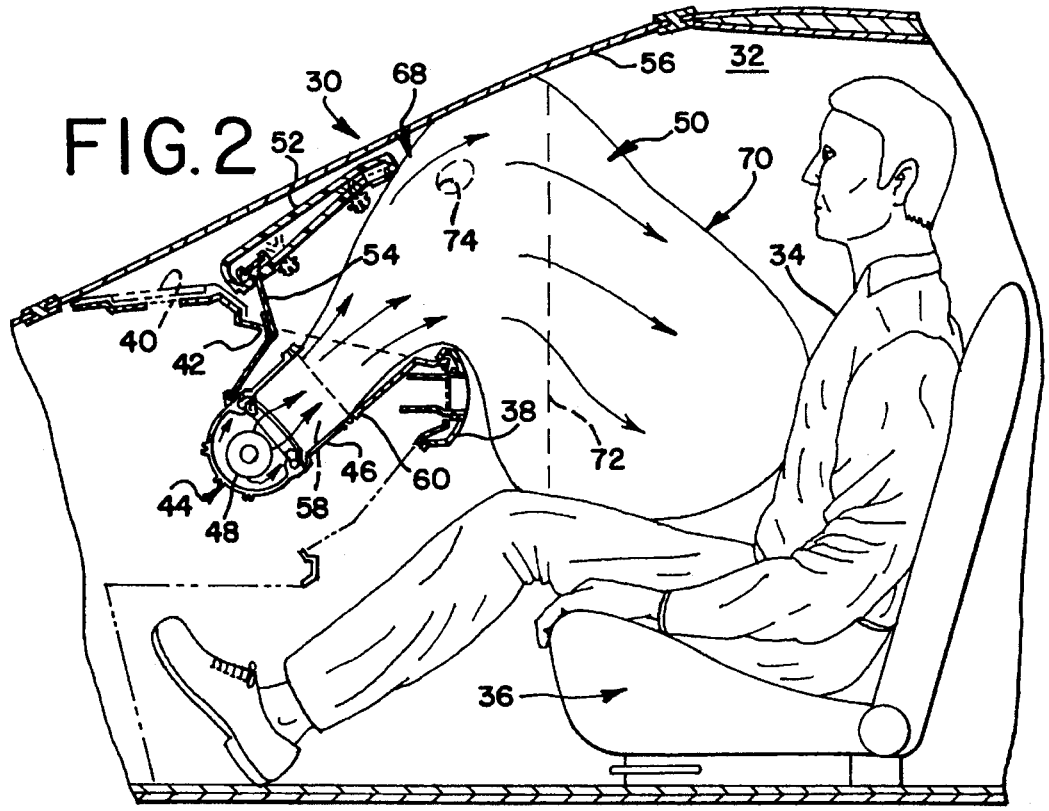
FIG. 2 is a longitudinal cross-sectional view similar to FIG. 1 but illustrating the air bag cushion in a deployed inflated condition for restraining a vehicle occupant.

Referring now more particularly to the drawing, in FIGS. 1–2 is illustrated a motor vehicle 30 having a passenger compartment 32 for accommodating a person 34 in seated position on a vehicle seat 36. Forward of the occupant 34, the vehicle 30 includes a dashboard 38 and a panel 40 having an enlarged air bag deployment opening 42 spaced directly above an air bag inflator module assembly 44 including a housing 46 fixedly mounted in place beneath the panel 40 directly below the air bag deployment opening 42 and containing a gas generator 48 adjacent an inner portion thereof. An air bag 50 in deflated condition is stored and contained within the housing 46 until deployed as illustrated in FIG. 2 to protect the vehicle occupant 34 or passenger from injury in an accident. The panel opening 42 is normally closed by a movable cover 52, which normally forms part of the upper surface of the panel 40 above the panel opening 42. When the air bag 50 is inflated during a crash or emergency and expands rapidly outwardly, the cover 52 is rapidly moved away from the panel opening 42 permitting the expanding air bag to rapidly inflate as shown in FIG. 2. When air bag deployment occurs, the cover 52 is restrained by a tether 54, to prevent inadvertent damage or injury to the passengers 34 or other portions of the passenger compartment 32.

As shown in FIG. 3, when the air bag cushion 50 is fully inflated, in a free condition without encountering obstruction such as the windshield 56 of the vehicle 30 the air bag shape generally resembles the construction and shape of a common pillow and accordingly, air bag cushions of this type have become known as "pillow" type air bags suitable for use on the passenger side of a vehicle. The "pillow" type air bag 50 includes an inlet or filling chute 58 of generally rectangular or oval transverse cross-section open at the inner end to receive gas flow through an open end 60 of the housing 46 from the gas generator 48 when deployment occurs. The outer end of the inlet chute 58 is joined to a generally rectangular shaped panel or back wall 62 (FIG. 4) formed of thin, flexible, sheet material by means of a line of stitching 64 or other adhesive means extending around a generally rectangular filler opening 66 positioned above a mid level end of the panel between a small upper segment or wall portion 68a and a larger sized lower segment or wall portion 68b below a dividing line 71a between the back panel segments.

The "pillow" type air bag 50 includes a front panel or wall 70 also formed of thin flexible sheet material having a size and shape similar to that of the back panel 62 and joined thereto around the periphery by lines of stitching 72a and 72b or other adhesive means above and below the dividing line 71b. The front panel 70 and/or the back panel 62 may be provided with a pair of relatively smaller circular vent holes 74 in the smaller upper segment 68 on opposite sides of the large rectangular filler opening 66 to facilitate deflation of the air bag cushion 50 after deployment has taken place. As illustrated in FIGS. 4 & 5, both the back panel 62 and front panel 70 have rounded upper corners 76 and rounded lower corners 78 matching one another. Either or both panel segments 70a and 70b of the front panel 70 are adapted to engage and cushion or restrain the vehicle passenger 34 as shown in FIG. 2 to prevent injury when an emergency occurs and the air bag cushion 50 is rapidly inflated in deployment.

Referring now to FIGS. 6 and 7, the inlet chute 58 of the air bag cushion 50 is inserted into the housing 46 from the open end 60 and is retained in place by a pair of rod-like holding elements 80 inserted into pockets provided at the inner end of the inlet chute and secured in larger grooves formed in opposite sidewalls of the housing on the inner surface in a manner known in the art. The air bag cushion 50 is laid out flat on a support platen 82 and arranged with the large segment 68b of the back wall 62 in overlying relation above the smaller segment 68a with the front wall 70 sandwiched in between as shown in FIG. 7 with the large segment 70b of the front wall overlying the small segment 70a. In the laid out position, the lower portion of the stitching line 72b is positioned outwardly and parallel of the back panel dividing line 71a and above and outwardly of the upper portion of the stitching line 72a. The dividing line 71b is spaced inwardly of the stitching lines 72b an 72a and comprises a fold line of the front wall 70 of the air bag cushion 50 spaced outwardly from the open end 60 of the housing 46.

Referring to FIGS. 8 and 9, a relatively large size, central clamping blade 84 having opposite side edges 84a and 84b is positioned above a central portion of the air bag cushion 50 extending outwardly of the open end 60 of the housing 46 between opposite end walls 46a and 46d. The clamping blade 84 is moved downwardly to clamp and hold the central portion of the air bag cushion 50 against the flat upper surface of the support platen 82 (dotted lines FIG. 8), which platen is generally rectangular in shape. Opposite outer side edge portions 50a and 50b of the clamped air bag cushion 50 project transversely outwardly beyond opposite side edges 82a and 82b of the platen 82 so that pairs of right and left hand long narrow clamping blade assemblies 86L and 86R, can grip and hold the opposite side edge bag portions at a level adjacent the level of the support platen 82 as shown in FIG. 9. Each clamping blade assembly 86L and 86R includes an upper blade 88 and a lower blade 90 and the blades are relatively long and narrow and are aligned transversely outwardly on opposite sides of the larger central clamping and holding blade 84 in parallel therewith as illustrated in FIGS. 8 and 9.

Referring now to FIGS. 10 and 11, after the opposite edge portions 50a and 50b of the air bag cushion 50 have been clampingly engaged by both of the clamping blade assemblies 86L and 86R, the right hand clamping blade assembly 86R is moved upwardly and transversely to the left as shown by the arrow A in FIG. 11, until the right hand edge portion 50b of the air bag cushion 50 is in a position overlying the large central clamping and holding blade 84. The right hand clamping blade assembly 86R is moved past the left hand edge 84a of the large central blade 84. In this position, a major portion 50b1, of the right hand edge portion 50b overlies the upper surface of the central clamping blade 84 forming a fold line 92 around the right hand edge 84b that is parallel to and slightly inwardly of a line extending outwardly of the right hand end wall 46b of the housing 46. A narrow portion 50b2 of the right hand edge portion 50b of the air bag cushion 50 overlies a marginal edge portion of the central blade 84 along the left hand edge 84a forming a fold line 94 parallel to the fold line 92 and positioned just inside a line extending outwardly of the left hand end wall 46a of the housing 46.

Referring to FIGS. 12 and 13, the left hand clamping blade assembly 86L is moved upwardly and transversely to the right as shown by the arrow C in FIG. 13 until the left hand edge portion 50a of the air bag cushion 50 is in a position overlying the large central clamping blade 84 as well as the folded portions 50b1, and 50b2 of the right hand edges portion 50b. The left hand clamping blade assembly 86L is moved past the right hand edge 84b of the central clamping blade 84. In this position, a major portion 50a1 of the left hand edge portion 50a of the air bag cushion overlies the central clamping blade 84 as well as the portions 50b1, and 50b2 of the right hand edge portion 50b forming an outer fold line 96 slightly outwardly of and parallel to the fold line 94.

A narrow portion 50a2 of the left hand edge portion 50a of the air bag cushion 50 overlies a marginal edge portion of the large central blade 84 along the right hand edge 84b forming a fold line 98 slightly outwardly of and parallel to the fold line 92. When the side edge portions 50a and 50b of the air bag cushion 50 have been folded as described, the large central clamping blade 84 and the narrow clamping blade assemblies 86L and 86R are withdrawn leaving the air bag cushion in a side folded condition as described comprising an edge folded tongue 100 projecting outwardly of the open end 60 of the housing.

In accordance with an important feature of the present invention, the elongated tongue-like projection or tongue 100 comprising the partially folded-up air bag cushion 50 as shown in FIGS. 11–15, extends directly outwardly of the open end 60 of the housing 46 while resting on the platen 82. In this condition, the tongue 100 has a transverse width dimension W which is less than the wall to wall clearance between the opposite end walls 46a and 46b of the housing 46. The tongue 100 has a longitudinal dimension or length L measured from the open end 60 of the housing 46 to an outer end E (FIG. 14) and at any point along the length L, the extended tongue 100 may be clamped by a rolling clamp assembly 102 having a pair of elongated, narrow, opposite clamping blades 104 extending transversely across the length of the tongue. The rolling clamp assembly 102 may be applied to clamp the tongue 100 at any point along the length L thereof and preferably as shown in FIG. 14, the clamping blades 104 are applied at a position outwardly of an adjacent outer edge 82c of the support platen 82.

After transverse clamping engagement on the tongue 100 near the end E the rolling blades 104 are turned or rolled in a clockwise direction as shown by arrow F in FIG. 15 and move to the right as indicated by the arrow G toward the open end 60 of the housing 46. This causes the tongue 100 of the folded air bag cushion 50 to be rolled-up in clockwise fashion as viewed in FIG. 17 until reaching a position wherein the partially rolled-up tongue is a distance L1, away from the open end 60 of the housing 46 as shown in FIGS. 16 and 17. An inverted channel-shaped open bottom, holding container 106 is moved downwardly (arrow H) onto the partially rolled-up air bag to prevent unrolling action from taking place, and then in this position the rolling blades 104 of the rolling clamp assembly 102 are withdrawn from the partially rolled-up folded air bag cushion 50 as shown in FIGS. 18 and 19.

The holding or roll-containing, inverted channel-shaped element 106 (channel element), includes a vertical inner wall 108 directly facing the housing 46 and normal to the support platen 82, a horizontal web 110 parallel and facing the platen 82, fixedly attached to the inner wall and an outer vertical wall 112 parallel of the inner wall and relatively movable in a vertical sense with respect to the web and the inner wall.

As shown in FIGS. 20 and 21, after the channel element 106 is in place on the partially rolled-up tongue 100 of the air bag cushion 50, the channel element is moved in a horizontal direction toward the housing 46 as indicated by the arrow J until the inner wall 106 is closely adjacent to the open end 60 of the housing. As this movement takes place a trailing portion 100A of the tongue 100 is left on the platen 82 projecting outwardly beyond the outer wall 112 of the containing channel element 106.

Referring to FIGS. 22 and 23, the inner wall 108 and the web 108 of the channel element 106 are elevated upwardly and moved to the right above the housing 46 as indicated by the arrow K in FIG. 23. However during this elevation, the outer wall 112 remains at the same level and forces the partially rolled-up air bag cushion 50 into the open end 60 of the housing 46 between the upper and lower side walls thereof. Further movement of the channel element 106 to the right is stopped when the outer wall 112 engages the edge of the upper sidewall of the housing 46 along the open end 60 of the housing 46 as shown in FIG. 23. In this position, a trailing end portion 100A of the tongue 100 of the air bag cushion 50 still remains outside of the open end 60 of the housing 46.

Figure 26:
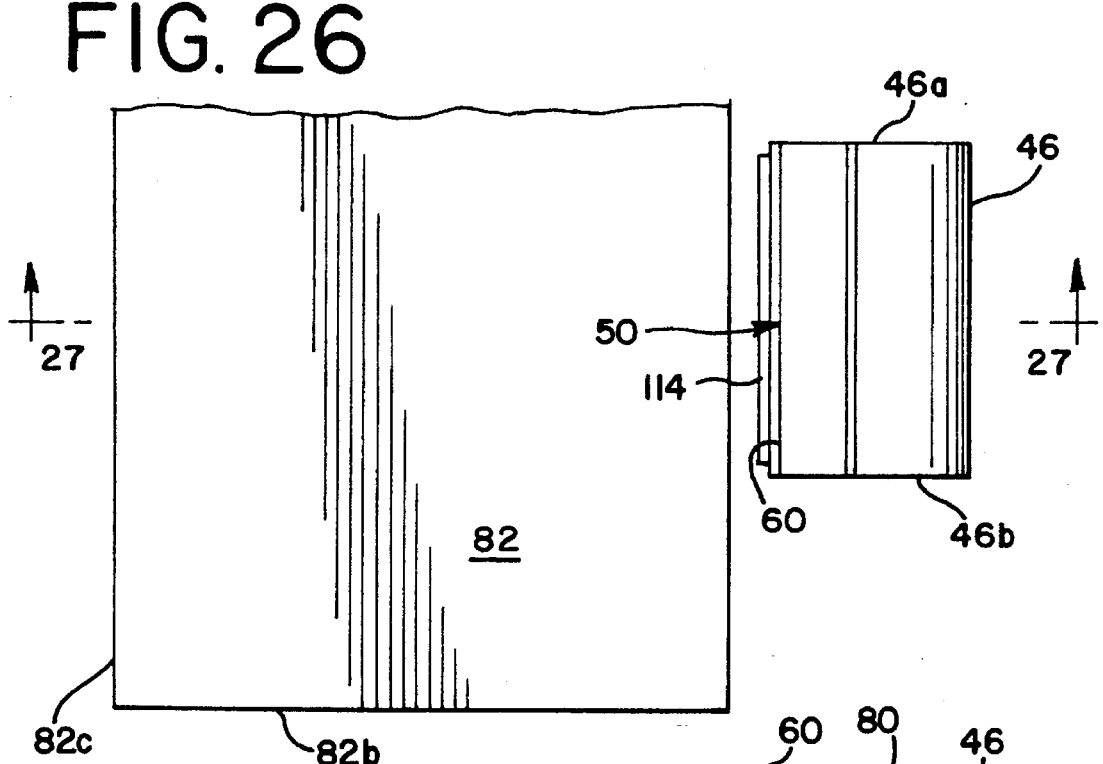
FIG. 26 is a top plan view similar to FIG. 24 illustrating the air bag cushions in a fully inserted position in the housing.
Figure 27:
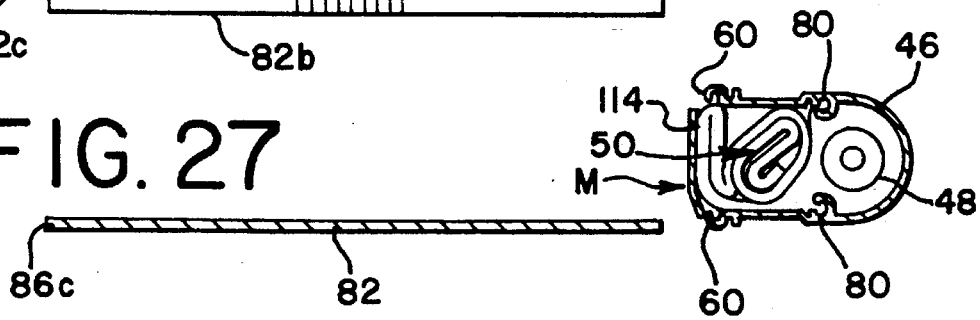
FIG. 27 is a cross-sectional view taken substantially along lines 27—27 of FIG. 26.

Referring to FIGS. 24 and 25, a vertical tuck blade 114 is rotated upwardly as indicated by the arrow L in FIG. 25, causing the trailing end portion 100A of the tongue 100 of the air bag cushion 50 to be rotated upwardly against the outside surface of the outer wall 112 of the channel element 106. Thereafter as shown in FIGS. 26 and 27 the outer wall 112 of the channel element 106 is withdrawn upwardly and the tuck blade 114 is moved horizontally as indicated by the arrow M against the remaining trailing end portion 100A of the air bag cushion 50 to complete the full insertion of the folded and rolled-up air bag into the housing 46 from the open end 60 thereof.

The folding, rolling and insertion method and apparatus in accordance with the present invention is easy and quick and results in a favorable deployment pattern of the air bag cushion 50 during rapid inflation in an emergency. The folding action described reduces the number of pleats and the air bag cushion pack volume and enables automated equipment to be efficiently employed. The rolling action effected by the blades 104 may be commenced at any point along the length L of the folded-up tongue 100 and the number and the components complexity of equipment required is reduced resulting in an extremely fast and efficient method and means for packing a "pillow" type inflatable air bag cushion in a housing of an air bag module assembly.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A method of packing an inflatable air bag restraint cushion into a housing of an air bag module assembly for a motor vehicle occupant restraint system comprising the steps of:

provu an air bag cushion comprising joined together front panel and back panel, said back panel including an inlet chute positioned between a smaller back panel portion and a larger back panel portion;

securing said inlet chute of said air bag cushion into an open end of said housing positioned between opposite end walls of said housing with said back panel and said front panel of said air bag cushion extending outwardly of said open end;

folding said larger portion of said back panel in overlaying position over said smaller portion of said back panel on a substantially flat supporting surface with said front panel folded between said back panel portions;

folding a first outer side edge portion of said air bag transversely to overlay a central portion of said back panel and folding a second opposite outer side edge portion of said air bag transversely to overlay a central portion of said back panel as well as said folded first outer side edge portion, thereby forming fold lines along opposite outer side edges of said air bag projecting outwardly of said open end and positioned inside said opposite end walls of said housing;

rolling up said air bag after folding about a roll axis toward said open end of said housing; and moving said air bag after folding and rolling into said open end of said housing.

2. The method of claim 1, wherein:

said central portion of said air bag is clamped against said supporting surface while said opposite outer side edge portions are being folded.

3. The method of claim 2, wherein:

said fold lines along said opposite outer side edge portions of said air bag define a tongue having a width between said fold lines less than the distance between opposite end walls of the housing.

4. The method of claim 3, wherein:

said tongue has a length normal to said width projecting outwardly of the open end of the housing toward an outer end of said tongue.

5. The method of claim 4, wherein:

said rolling up of said air bag is started at a variable position along the length of the tongue spaced between the housing and the outer end of the tongue.

6. The method of claim 5, wherein:

said rolling up of said air bag is discontinued between the position where started and the open end of the housing forming the tongue of the air bag into a partially rolled-up condition.

7. The method of claim 6 wherein:

the air bag in partially rolled-up condition is moved to a position closely adjacent to the open end of the housing without further rolling action leaving a trailing end portion extending outwardly thereof.

8. The method of claim 7, wherein:

said moving step initially forces said partially rolled-up air bag completely into the open end of the housing except for a portion of said trailing end portion remaining outside.

9. The method of claim 8 including the step of:

folding of said trailing end portion remaining outside toward said air bag inside said housing.

10. The method of claim 9, wherein:

said moving step includes a final movement of said folded up remaining trailing end portion into the open end of the housing.

11. A method of packing an inflatable air bag restraint cushion into a housing of an air bag module assembly for a motor vehicle occupant restraint system comprising the steps of:

providing an air bag cushion comprising joined together front panel and back panel, said back panel including an inlet chute positioned between a smaller back panel portion and a larger back panel portion;

securing said inlet chute of said air bag cushion into an open end of said housing positioned between spaced opposite right and left end walls of said housing with said back panel and said front panel of said air bag cushion extending outwardly of said open end;

folding flatly said larger portion of said back panel in overlaying position over said smaller portion of said back panel with said front panel folded between said back panel portions;

folding an outer right side edge portion of said air bag transversely to the left to overlay a central portion of said back panel, forming a first fold line along the right side of said air bag projecting outwardly of said open end and positioned just inside said right end wall of said housing and leaving a leading unfolded left end portion positioned outside said left end wall of said housing;

folding said leading unfolded left end portion of said folded outer right side edge portion of said air bag transversely to the right to overlay itself, forming a second fold line along the left side of said air bag projecting outwardly of said open end and positioned just inside said left end wall of said housing;

folding an opposite outer left side edge portion of said air bag transversely to the right to overlay a central portion of said back panel and said twice folded outer right side edge portion, forming a third fold line outside of said second fold line projecting outwardly of said open end and positioned just inside the left end wall of said housing and leaving a leading unfolded right end portion positioned outside said right end wall of said housing;

folding said leading unfolded right end portion of said folded opposite outer left side edge portion of said air bag transversely to the left to overlay itself, forming a fourth fold line generally above said first fold line projecting outwardly of said open end and positioned just inside the right end wall of said housing;

rolling up said air bag after folding about a roll axis toward said open end of said housing; and inserting said air bag after folding and rolling into said open end of said housing.

* * * * *